(12) United States Patent
Lee

(10) Patent No.: US 10,148,449 B2
(45) Date of Patent: Dec. 4, 2018

(54) PUSH MESSAGE SERVICE SYSTEM AND METHOD

(71) Applicant: Samsung Electronics Co., Ltd., Gyeonggi-do (KR)

(72) Inventor: Kiwon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 472 days.

(21) Appl. No.: 14/423,557

(22) PCT Filed: Aug. 30, 2013

(86) PCT No.: PCT/KR2013/007854
§ 371 (c)(1),
(2) Date: Feb. 24, 2015

(87) PCT Pub. No.: WO2014/035194
PCT Pub. Date: Mar. 6, 2014

(65) Prior Publication Data
US 2015/0207893 A1    Jul. 23, 2015

(30) Foreign Application Priority Data

Aug. 30, 2012 (KR) .................. 10-2012-0095863
Aug. 29, 2013 (KR) .................. 10-2013-0103382

(51) Int. Cl.
*G06F 15/16* (2006.01)
*H04L 12/18* (2006.01)
(Continued)

(52) U.S. Cl.
CPC .......... *H04L 12/1859* (2013.01); *G06F 9/46* (2013.01); *H04L 51/14* (2013.01); *H04L 51/32* (2013.01);
(Continued)

(58) Field of Classification Search
CPC ......... H04L 51/06; H04L 51/36; H04L 51/38; H04L 67/26; H04L 51/14; H04L 51/32;
(Continued)

(56) References Cited

U.S. PATENT DOCUMENTS

| 8,244,822 B1 | 8/2012 | Lowry et al. |
| 2008/0201407 A1 | 8/2008 | Fodor |

(Continued)

FOREIGN PATENT DOCUMENTS

| CN | 101068262 | 11/2007 |
| CN | 101087261 | 12/2007 |

(Continued)

OTHER PUBLICATIONS

Chinese Office Action dated Dec. 28, 2017 issued in counterpart application No. 201380045455.9, 10 pages.

(Continued)

*Primary Examiner* — Jungwon Chang
(74) *Attorney, Agent, or Firm* — The Farrell Law Firm, P.C.

(57) ABSTRACT

A push message service method and system capable of allowing a service server to develop a standardized push message format to keep up with different Operating Systems (OSs)-based multiple platforms environment or single user account-multiple platforms environment and preventing push messages from being lost is provided. The multi-push message system supporting multiple platforms includes at least one service server which generates a multi-push message including per-terminal granted push tokens and messages (pns) to be transmitted per push server, a multi-push message manager which checks validity of the multi-push message, parses the multi-push message, generates push messages corresponding to types of the platforms of the push servers based on the messages (pns), and sends the (Continued)

push message to the respective push servers, and a push server which transmits the push message to the terminal corresponding to the push token.

20 Claims, 12 Drawing Sheets

(51) Int. Cl.
    *G06F 9/46*     (2006.01)
    *H04L 12/58*     (2006.01)
    *H04L 29/08*     (2006.01)
    *H04W 4/12*     (2009.01)

(52) U.S. Cl.
    CPC .............. *H04L 51/36* (2013.01); *H04L 67/26* (2013.01); *H04W 4/12* (2013.01)

(58) Field of Classification Search
    CPC ........ G06Q 20/401; H04W 4/12; H04W 4/00; G06F 9/46
    USPC ........ 709/204–206; 714/18; 726/4; 370/389, 370/252; 455/414.2, 435.1, 466
    See application file for complete search history.

(56) References Cited

U.S. PATENT DOCUMENTS

| | | | |
|---|---|---|---|
| 2008/0244023 A1 | 10/2008 | Guedalia et al. | |
| 2009/0143052 A1* | 6/2009 | Bates | G06F 17/30575 455/414.2 |
| 2009/0158397 A1* | 6/2009 | Herzog | H04L 51/38 726/4 |
| 2012/0157098 A1* | 6/2012 | Singh | H04L 65/105 455/435.1 |
| 2012/0173610 A1* | 7/2012 | Bleau | H04L 67/26 709/203 |
| 2012/0210415 A1* | 8/2012 | Somani | H04L 63/0884 726/9 |
| 2012/0307656 A1* | 12/2012 | Vyrros | H04L 12/1859 370/252 |
| 2013/0047034 A1* | 2/2013 | Salomon | H04W 4/00 714/18 |
| 2013/0084896 A1* | 4/2013 | Barkie | H04W 12/02 455/466 |
| 2013/0322435 A1* | 12/2013 | Wood | H04L 49/90 370/389 |

FOREIGN PATENT DOCUMENTS

| | | |
|---|---|---|
| CN | 101103592 | 1/2008 |
| EP | 1853045 | 11/2007 |
| WO | WO 2012096438 | 7/2012 |

OTHER PUBLICATIONS

Korean Office Action dated Dec. 22, 2014 issued in counterpart application No. 10-2013-0103382.
PCT/ISA/237 Written Opinion issued on PCT/KR2013/007854 (pp. 7).
PCT/ISA/210 Search Report issued on PCT/KR2013/007854 (pp. 3).

* cited by examiner

[Fig. 1]
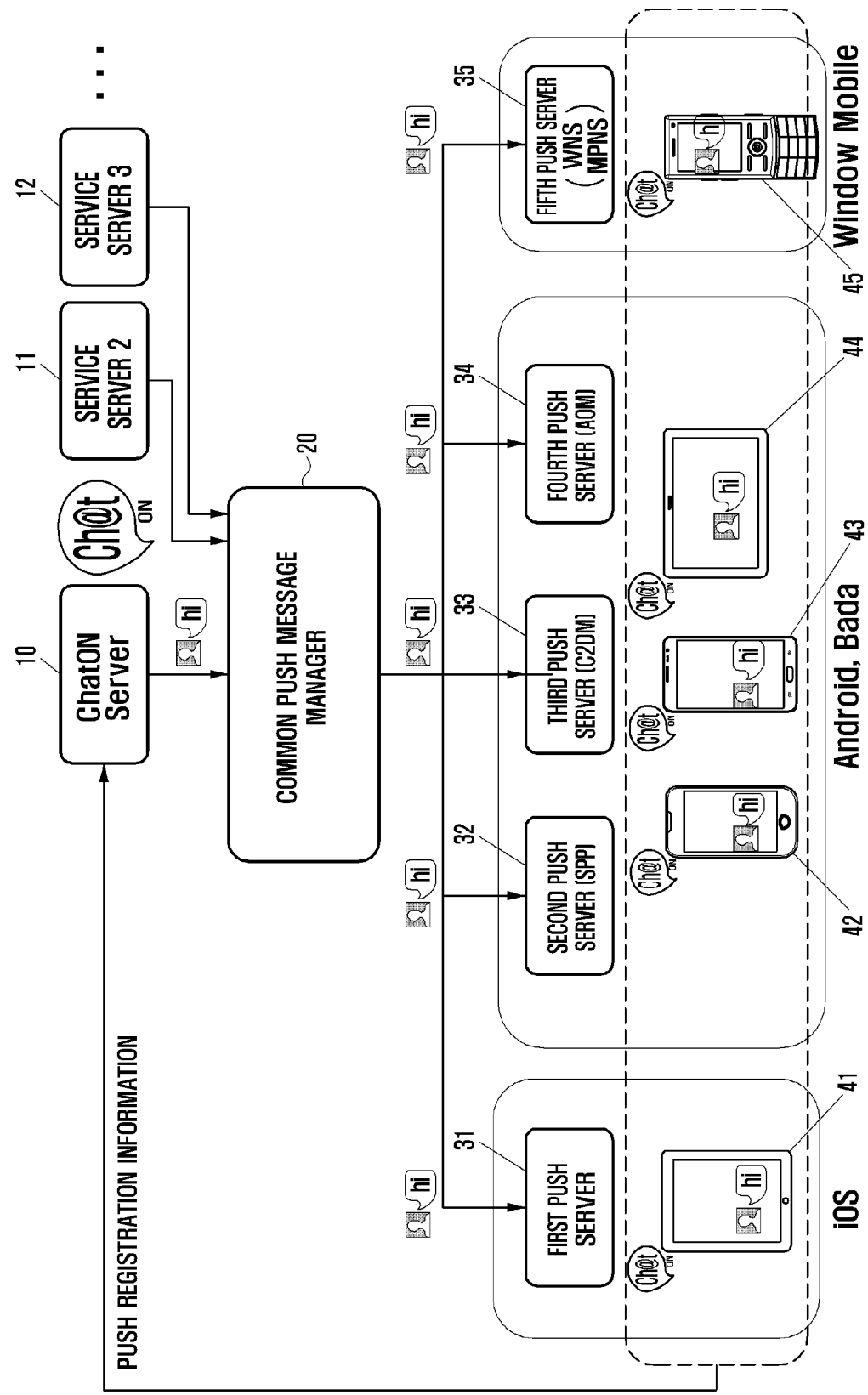

[Fig. 2]

| Key | Type | Description |
|---|---|---|
| tip | string | UNIQUE REQUESTED PUSH MESSAGE ID |
| appid | string | UNIQUE SERVICE ID |
| pns | array | MESSAGE INFORMATIONS TO BE SENT TO THE PUSH SERVERS (DEFINED AS ARRANGEMENT PER PUSH SERVER) |
| pnsType | string | TYPE OF PUSH MESSAGE TO BE REQUESTED |
| pushToken | string | SERVICE APP AUTHENTICATION INFORMATION OF PLATFORM TO TRANSMIT PUSH MESSAGE |
| ...... | string | DEFINE MESSAGES TO BE TRANSMITTED TO PUSH SERVER AS KEY VALUE |

[Fig. 3]

Request Sample

```
{
  "tid" : "tid_1234567890",
  "appid" : "appid",
  "pns" : [
    {
      "pushType" : "SPP",
      "pushAppid" : "apnsAppid",
      "pushToken" : "sppRegId",
      "message" : "The message Maximum length is 2kb",
      "appData" : "3rd party applications usage data."
    },
    {
      "pushType" : "AQM",
      "pushAppid" : "spnsAppid",
      "pushToken" : "aom deviceToken",
      "payload" : "eyJhcHMiOnsiYWxlcnQiOiHOZXN0IiwiYmFkZ2UiOjksInNv"
    },
    {
      "pushType" : "APNS",
      "pushAppid" : "apnsAppid",
      "pushToken" : "apns deviceToken",
      "payload" : "eyJhcHMiOnsiYWxlcnQiOiJ0ZXN0IiwiYmFkZ2UiOjksInNv"
    }
  ]
}
```

[Fig. 4]
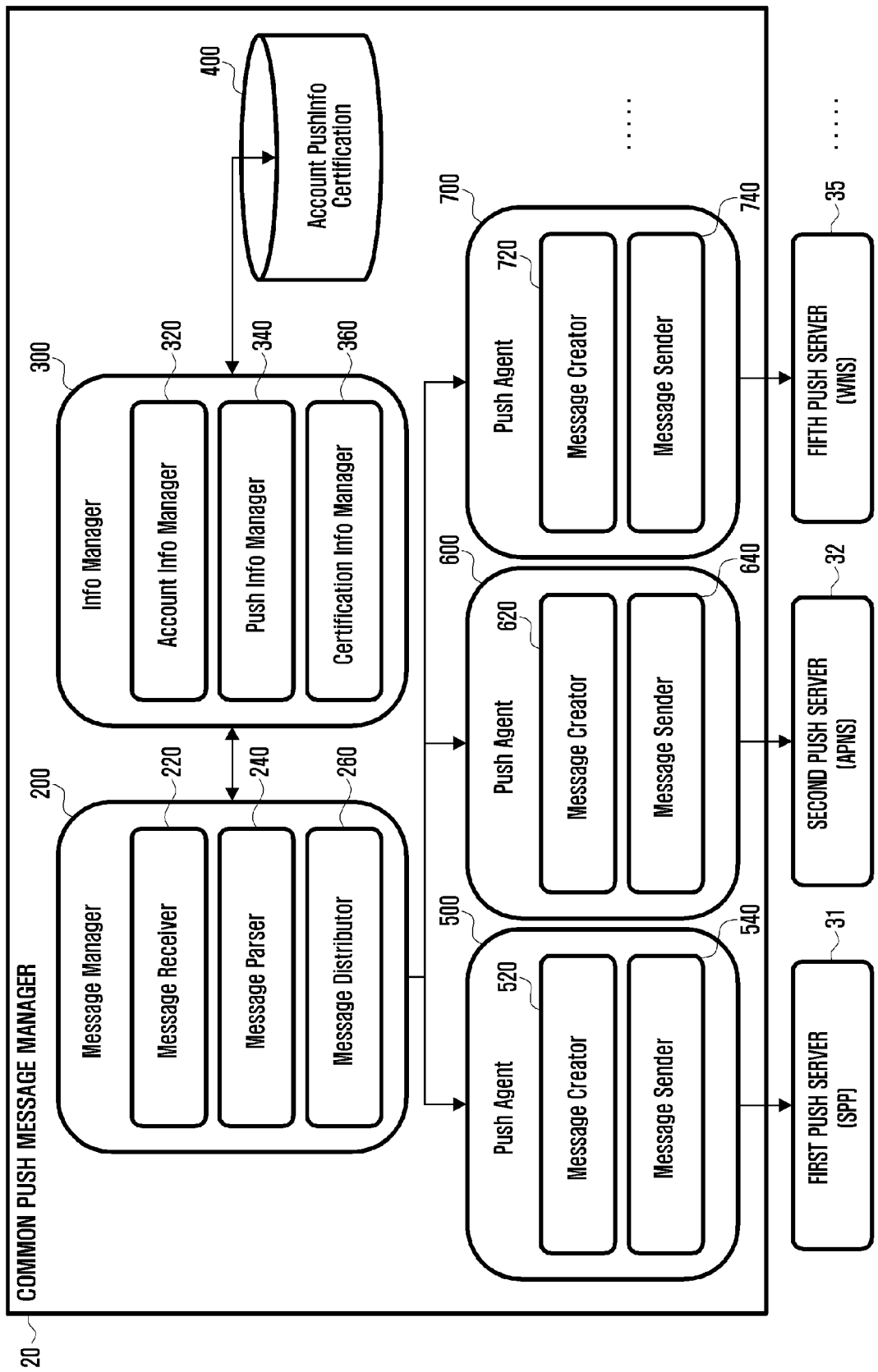

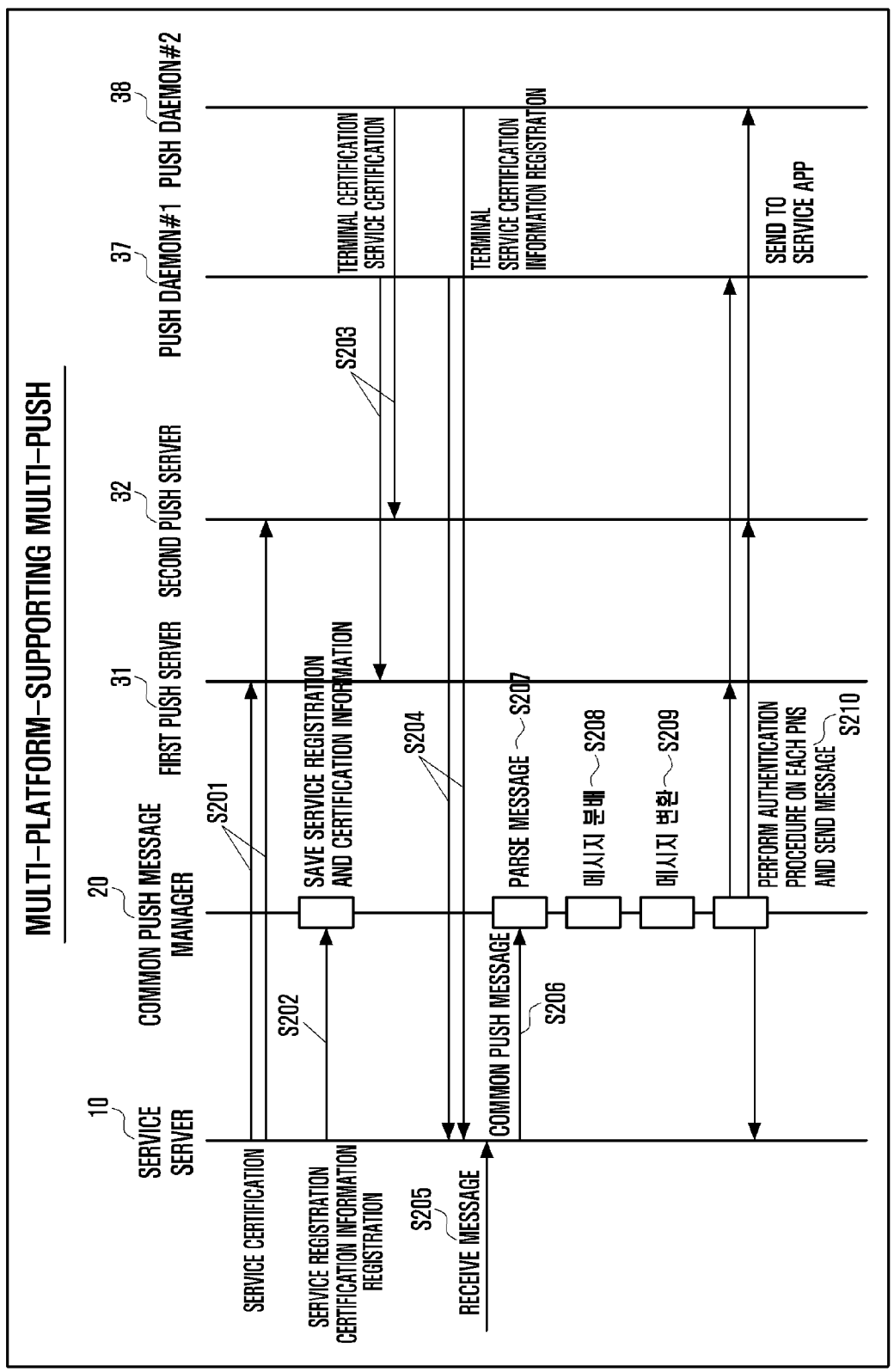
[Fig. 5]

[Fig. 6]
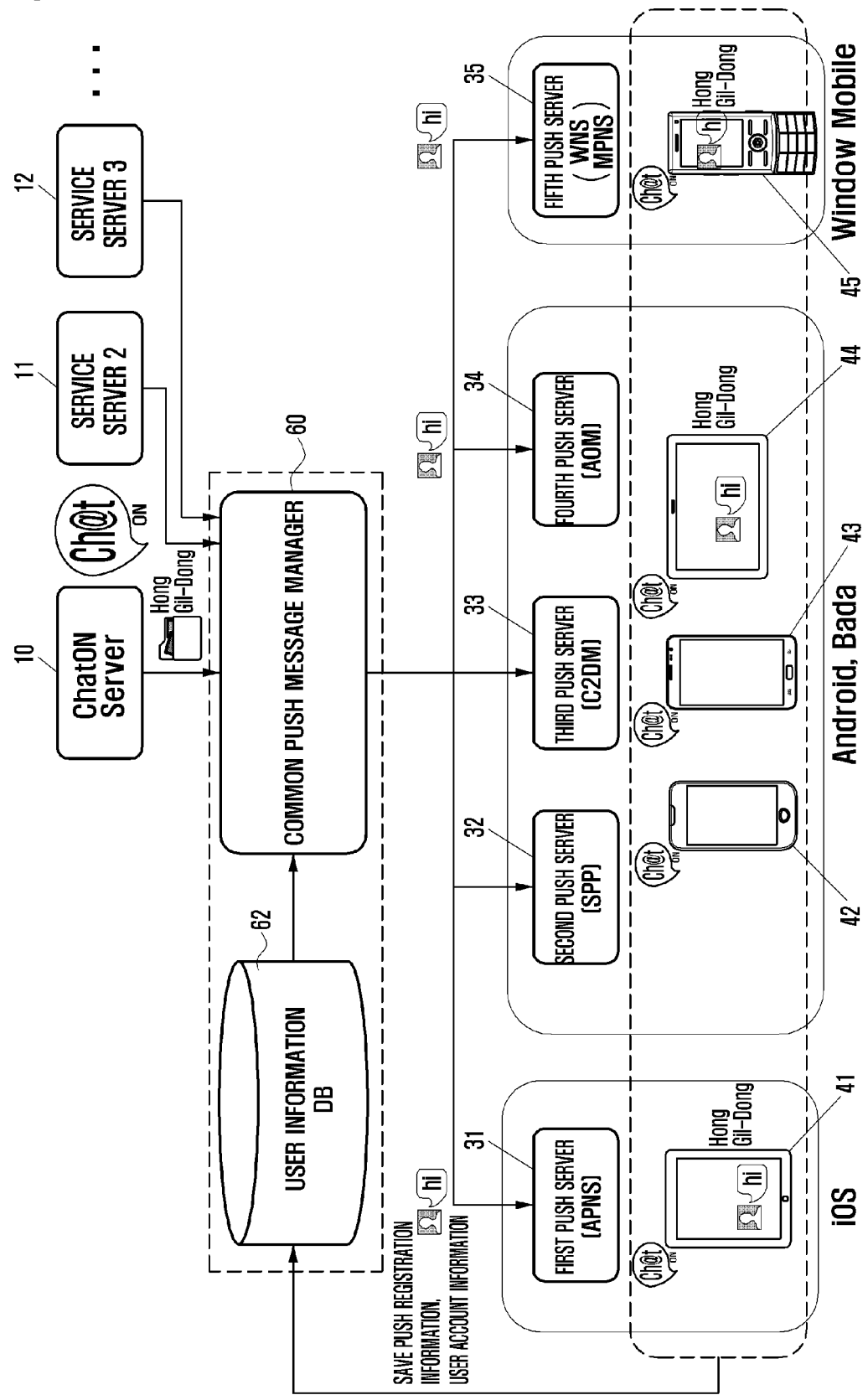

[Fig. 7]

| Key | Type | Description |
|---|---|---|
| tip | string | UNIQUE REQUESTED PUSH MESSAGE ID |
| uid | string | 전달할 사용자 계정에 대한 고유한 아이디 |
| appid | string | UNIQUE SERVICE ID |
| pns | array | MESSAGE INFORMATIONS TO BE SENT TO THE PUSH SERVERS (DEFINED AS ARRANGEMENT PER PUSH SERVER) |
| pnsType | string | TYPE OF PUSH MESSAGE TO BE REQUESTED |
| ...... | string | DEFINE MESSAGES TO BE TRANSMITTED TO PUSH SERVER AS KEY VALUE |

[Fig. 8]

Request Sample

```
{
    "tid" : "tid_1234567890",
    "uid" : "uid1234567890",
    "appid" : "ospAppid_1234567890",
    "ignoredPushToken" : "ignoredPushToken 17894147389347182734841378912399874",
    "pns" : [
        {
            "pushType" : "SPP",
            "message" : "The message Maximum length is 2kb",
            "appData" : "3rd party applications usage data."
        },
        {
            "pushType" : "APNS",
            "payload" : "eyJhcHMiOnsiYWxlcnQiOiJOZXN0IiwiYmFkZ2UiOjksInNv"
        }
    ]
}
```

[Fig. 9]
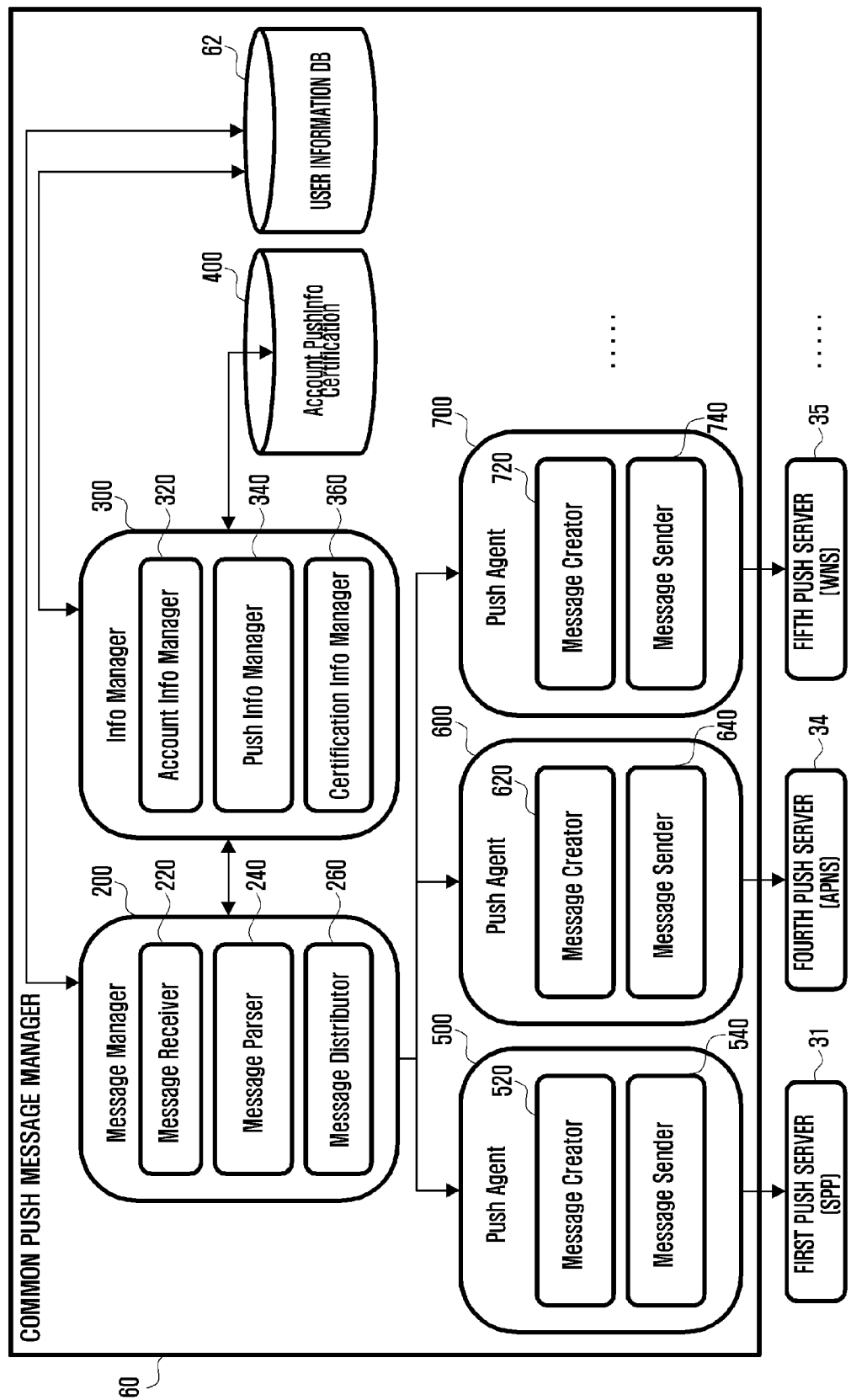

[Fig. 10]
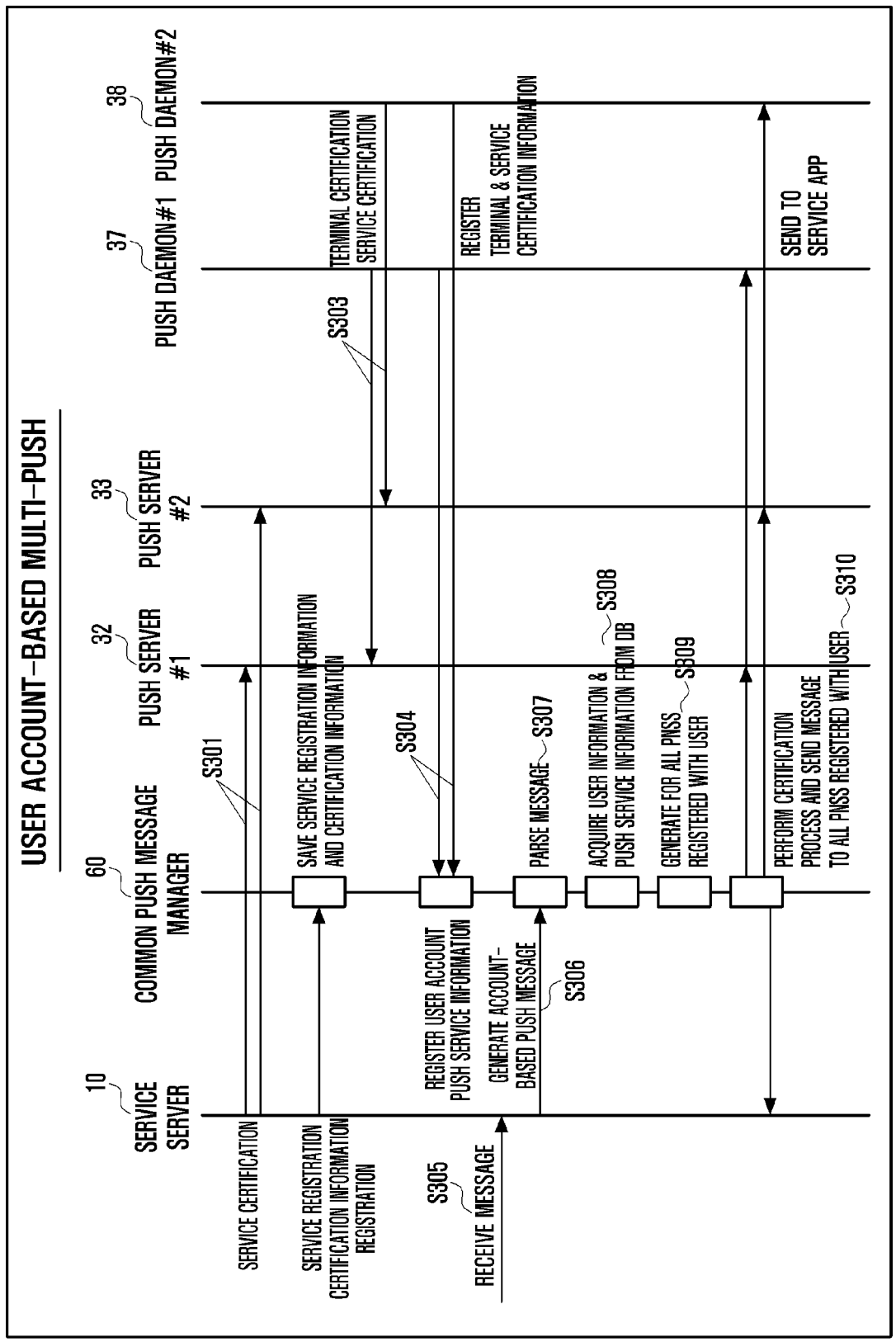

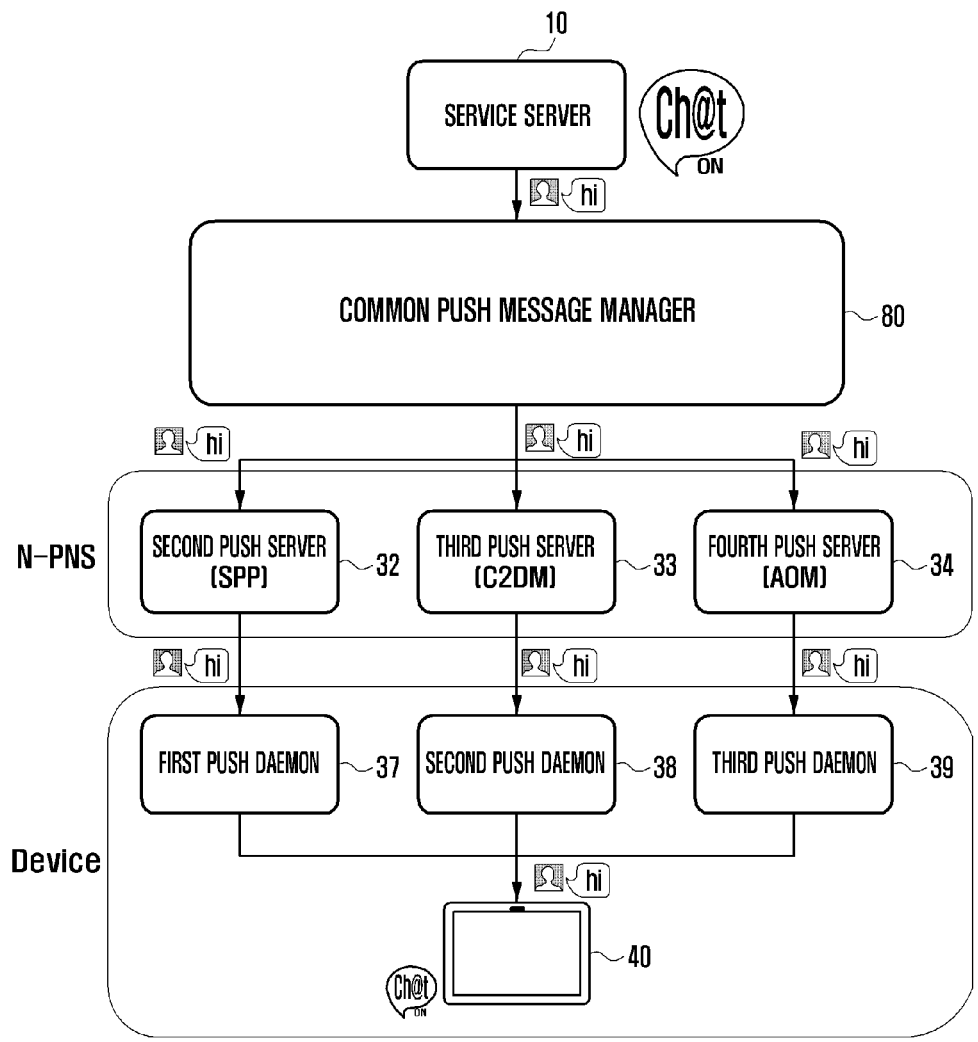
[Fig. 11]

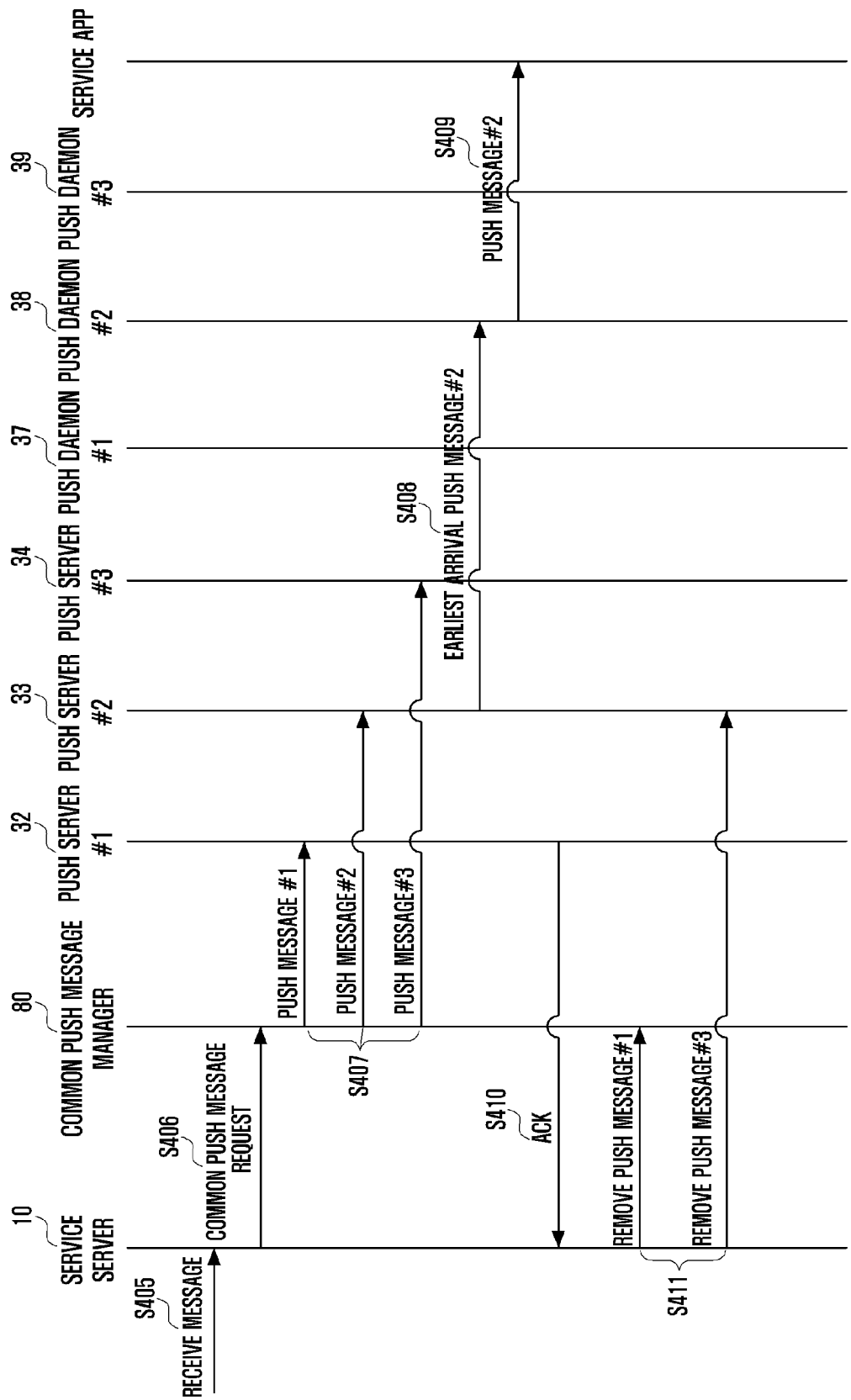
[Fig. 12]

PUSH MESSAGE SERVICE SYSTEM AND METHOD

TECHNICAL FIELD

This disclosure relates to push messaging service and, in particular, to a push message service method and system capable of allowing a service server to develop a standardized push message format to keep up with different Operating Systems (OSs)-based multiple platforms environment or single user account-multiple platforms environment and preventing push messages from being missed.

BACKGROUND ART

With the advance of communication technologies, the terminal platforms have been diversified and, as a consequence, the various push services have been developed to meet the requirements of the individual terminal platform.

Also, with the diversification of the user devices it is not rare for a single user to carry and use plural mobile devices such as tablet PC, smartphone, and other smart terminals.

However, it is the actual circumstance that the conventional push message service system cannot support all mobile devices operating on different OSs.

For example, although most users owned multiple devices operating on different OSs want to receive the push message service with some or all of the owned devices, the conventional push message service cannot fulfill such user requirements.

This is because there is no standard of message for push service and no standardized push message service system yet. Accordingly, the push services working on the different platforms are provided with their own message format definitions and thus the associated services are also being developed based on the respective push service definitions.

Also, the mobile services are also being developed to support the various mobile platforms. As a consequence, the push services operating on the different platforms define different message formats and this requires multiple platform-specific versions of same service and makes it difficult to develop platform-transparent services.

Recently, most users use plural terminal devices and want to access the same service using the plural terminal devices. In this case, in order for a user to access the same service with terminals operating on different platforms, the system has to support multi-push technique for multiple devices. However, this method has a drawback in that plural terminal-specific versions of the same message have to be generated per device and per push service.

The key factor of Quality of Service (QoS) of the push service is to maintain the connection between the push service server and the push service daemon of the terminal. By its nature, the push service requires constant connection between the push server and the push daemon to delivery messages immediately.

However, since the mobile terminal has the limit in hardware capability, it is difficult to guarantee the constant activation of the push service daemon. Accordingly, there is a probability of message delay and missing messages.

DISCLOSURE OF INVENTION

Technical Problem

The disclosure provides a push message service method and system that is capable of allowing a service server to develop a standardized push message format to keep up with different OS-based multiple platforms environment or single user account multiple platforms environment and preventing push messages from being delayed or missed.

Solution to Problem

In accordance with an aspect of the disclosure, a multi-push message system supporting multiple platforms is provided. The system includes at least one service server which generates a multi-push message including per-terminal granted push tokens and messages (pns) to be transmitted per push server, a multi-push message manager which checks validity of the multi-push message, parses the multi-push message, generates push messages corresponding to types of the platforms of the push servers based on the messages (pns), and sends the push message to the respective push servers, and a push server which transmits the push message to the terminal corresponding to the push token.

In accordance with another aspect of the disclosure, a system of providing push message service to multiple devices based on a user account is provided. The system includes a service server which generates an account-based push message including user account information (uid) and per-push server messages (pns), a user information database which store information on at least one push token mapped to respective user account information, an account-based push message manager which check validity of the account-based push message, parses the account-based push message, extracts push token mapped to the user account information (uid), generates push messages corresponding to types of platforms of push server corresponding to the push token, and sends the push message to respective push servers, and a push server sending the push message to at least one device corresponding to the push token mapped to the user account information (uid).

In accordance with another aspect of the disclosure, a method for supporting multi-push message standardized for different platforms is provided. The method includes receiving, at least one service server providing different services, a message including a push token, transmitting, at the service server, the multi-push message generated in a format standardizing the message to a multi-push message manager, checking, at the multi-push message manager, validity of the multi-push message, generating a push message corresponding to the platform type of the push server based on the messages (pns) to be transmitted to the push server by parsing the multi-push message, receiving, at the push server, the push message from the multi-push message manager, and transmitting the push message to the terminal corresponding to the push token.

In accordance with still another aspect of the disclosure, a method for providing push message service to multiple devices based on a user account is provided. The method includes receiving, at a service server, a message including account information (uid) of a user having at least one device, transmitting, at the service server, an account-based push message generated in a standardized format to an account-based push message manager, checking, at the account-based push message manager, validity of the account-based push message, extracting the push token and push server information mapped to the user account information by parsing the account-based push message, generating the push message corresponding to the platform of the push server based on the messages (pns) to be transmitted to the push servers, receiving, at the push server, the push message from the account-based push message manager, and transmitting the push message to the terminal having the same user account.

Advantageous Effects of Invention

The disclosure provides a push message service method and system that is capable of allowing a service server to develop a standardized push message format to keep up with different OS-based multiple platforms environment or single user account multiple platforms environment and preventing push messages from being delayed or missed.

BRIEF DESCRIPTION OF DRAWINGS

FIG. 1 is a block diagram illustrating a configuration of a common push message service system according to a an embodiment of the disclosure;

FIG. 2 is a diagram illustrating a table listing information elements constituting a common push message for use in the common push message service system according to an embodiment of the disclosure;

FIG. 3 is a diagram illustrating a common push message format for use in the common push message service system according to an embodiment of the disclosure;

FIG. 4 is a block diagram illustrating a configuration of the common push message manager according to an embodiment of the disclosure;

FIG. 5 is a message flow diagram illustrating message flows in the push message service method according to an embodiment of the disclosure;

FIG. 6 is a block diagram illustrating a configuration of the common push message service system according to an embodiment of the disclosure;

FIG. 7 is a diagram illustrating a table listing information elements constituting a common push message for use in the common push message service system according to another embodiment of the disclosure;

FIG. 8 is a diagram illustrating a common push message format for use in the common push message service system according to another embodiment of the disclosure;

FIG. 9 is a block diagram illustrating a configuration of the common push message manager according to an embodiment of the disclosure;

FIG. 10 is a signal flow diagram illustrating signal flows in the push message service method according to an embodiment of the disclosure;

FIG. 11 is a block diagram illustrating a configuration of the common push message system according to another embodiment of the disclosure; and FIG. 12 is a signal flow diagram illustrating message flows in a push message-missing protection system according to an embodiment of the disclosure.

MODE FOR THE INVENTION

Exemplary embodiments of the disclosure are described with reference to the accompanying drawings in detail. The terms and words used in this description and the appended claims are not to be interpreted in common or lexical meaning but, based on the principle that an inventor can adequately define the meanings of terms to best describe the invention, to be interpreted in the meaning and concept conforming to the technical concept of the disclosure. Thus, it should be understood that there may be various equivalents and modified examples that can replace the embodiments described in the present specification and the configuration shown in the drawings at the time of filing the present application. In the drawings, certain elements may be exaggerated or omitted or schematically depicted for clarity of the invention, and the actual sizes of the elements are not reflected. Thus, the disclosure is not limited in the relative sizes of the elements and distances therebetween.

The push message service system and method of the disclosure is applicable to portable terminals. The portable terminals include mobile phone, smartphone, tablet Personal Computer (PC), hand-held PC, Portable Multimedia Player (PMP), and Personal Digital Assistant (PDA). In the following, the description is made under the assumption that the message management method and apparatus are applied to a mobile terminal.

FIG. 1 is a block diagram illustrating a configuration of a common push message service system according to a an embodiment of the disclosure, FIG. 2 is a diagram illustrating a table listing information elements constituting a common push message for use in the common push message service system according to an embodiment of the disclosure, and FIG. 3 is a diagram illustrating a common push message format for use in the common push message service system according to an embodiment of the disclosure.

Referring to FIG. 1, the common push message service system may include at least one service server 10, 11, and 12, a common push message manager 20, a plurality of push servers 31 to 35, a plurality of platforms 41 to 45.

The service servers 10, 11, and 12 may be the servers providing push message services, e.g. Chat On message service server.

The service server 10 may receive the message including at least one push token allocated per platform (the first to fifth platforms 41 to 45). The message may be transmitted by a provider or identified platform.

The push token may be the application authentication information of the platform from which the push message has been received. That is, the push token may be the service application authentication information acquired from the push server at the initial connection of the platform with the service server 10.

Particularly, the service server 10 may process the received message including the plural push tokens to generate a common push message in the format standardized according to the disclosure. Unlink the conventional method in which the service server generates distinct push messages depending on the type of OS of the recipient platform, the method according to the an embodiment of the disclosure is capable of generating a common push message according to the format preconfigured in correspondence to the received message regardless of the type of OS of the recipient platform.

Referring to FIGS. 2 and 3, the common push message may include a unique received message identifier (tid), a unique service server identifier (appid), and message informations (pns) to be delivered to the respective push servers 31 to 35. The message information (pns) may include the push message type (pushType) of the corresponding push server based on the OS of the platform corresponding to the push token, unique supplication identifier (pushAppid) of the service application corresponding to the service server, and the push token (pushToken) for identifying the platform.

The common push message manager 20 may process the common push message received from the service server 10 to generate the push messages corresponding to the OSs according to the types of the OSs of the first to fifth platforms 41 to 45 corresponding to the plural push tokens.

The common push message manager 20 is capable of requesting to push the push message to the push servers 31 to 35 of the corresponding OSs. The common push message manager 20 is described in detail with reference to FIG. 4.

The first to fifth push servers 31 to 35 receive the push request through the respective push messages received form the common push message manager 20 and forward the push request to the service applications of the corresponding platforms 41 to 45.

The first to fifth push servers 31 to 35 may be configured in association with the types of the corresponding OSs of the respective platforms 41 to 45.

For example, the first push server 31 of the Apple Push Notification Service (APNS) may be provided in correspondence to the iOS of the first platform 41. Also, at least one of the second push server 32 operating on the Samsung Push Platform (SPP), the second push server 33 operating on the Cloud To Device Messaging frame work (C2DM), and the fourth push server 34 operating on the AOM may be provided in correspondence to the Android OS or Bada OS of the second platform 42, third platform 43, and fourth platform 44. The second to fourth platforms 42 to 44 may use at least one of Android and Bada OSs. The fifth push server 350 of the Microsoft Push Notification Service (MPNS) or Windows Push Notification Service (WNS) may be provided in correspondence to the Windows Mobile OS of the fifth platform 35.

It may be possible to add a new push server corresponding to a type of the OS used by the platform registered additionally with the service server 10.

The first to fifth platforms 41 to 45 may be provided with the dedicated applications for transmitting a predetermined service's message to the service server 100 in a predetermined format, or the service server may be provided with a dedicated service application including Application Programming Interface (API) for predetermined message communication.

The first to fifth platforms 41 to 45 may be the mobile devices such as smartphone, smart terminal, and tablet PC or any device as a part of mobile device-embedded vehicle, electric appliance, home networking, and personal computer.

The first to fifth platforms 41 to 45 may operate on different OSs and execute the service applications corresponding to the service server 10.

The first to fifth platforms 41 to 45 may receive the push token as the service application authentication information of the respective platforms from the push servers 31 to 35 operating on the corresponding OSs.

The first to fifth platform 41 to 45 may send the push token to the service server 10.

FIG. 4 is a block diagram illustrating a configuration of the common push message manager according to an embodiment of the disclosure.

Referring to FIG. 4, the common push message manager 20 may include a message manager 200, an info manager 300, an account push info certification unit 400, and push agents 500, 600, and 700.

The message manager 200 includes a message receiver 220, a message parser 240, and a message distributer 260. The info manager 300 may include an account info manager 320, a push info manager 340, and an authentication info manager 360.

The message receiver 220 may receive the common push message from the service server 10. The message parser 240 may parse the received common push message and perform validity verification on the common push message.

Particularly, the message parser 240 may identify at least one push token included in the common push message based on the message information (pns). The message distributer 260 may transmit the common push message to the corresponding push agents 500 to 700 per identified push token.

The message distributor 260 sends the common push message parsed by the message parser 240 and passed the validity text to the push agents 500 to 700.

The push agents 500, 600, and 700 may be configured for the associated push servers respectively. That is, the push agents 500, 600, and 700 may be configured in correspondence to the push servers supported by the common push message system.

For example, the common push message manager 20 may include a first push agent 500 corresponding to the first push server of APNS, a second push agent 600 corresponding to the second push server of SPP, and a fifth push agent 700 corresponding to the fifth push server of WNS.

In order for the push server of a new OS to use the common push message manager 20, a new push agent may be included additionally. That is, if a push server is added, the only thing necessary is to develop a corresponding push agent that can be supported by the push message system.

The push agents 500, 600, and 700 may include message creators 520, 620, and 720, and message senders 540, 640, and 740.

Each of the message creators 520, 620, and 720 may process the received common push message according to the OS of the push server corresponding to the identified push token to generate the push message to be sent to the push server.

That is, the first message creator 520 may convert the common push message to the push message specific to the iOS as the OS of the first push server 31, the second message creator 620 may convert the common push message to the push message specific to the Android as the OS of the second push server 32, and the third message creator 720 may convert the common push message to the push specific to Windows mobile as the OS of the fifth push server 35.

The message senders 540, 640, and 740 may request the corresponding push servers 310, 32, and 33 to push the push messages generated by the message creators 520, 620, and 720.

That is, the first message sender 540 may send the push message generated by the first message creator 520 to the first push server 31, the second message sender 640 may send the push message generated by the second message creator 620 to the second push server 32, and the third message sender 740 may send the push message generated by the third message creator 720 to the fifth push server 35.

The account push info certification unit 400 is capable of storing certification and registration information received from the first to fifth push servers 31 to 35 which the service server 100 intends to use.

The info manager 300 may register and manage the user account information, push token, and platform push service certificate information received from the first to fifth platforms 41 to 45.

Although the above embodiment is directed to the push message service method associated with the first service server, the push service methods of the other plural service servers 11 and 12 may operate in the same way. The plural service servers 10, 11, and 12 may use the common push message manager 20 simultaneously.

FIG. 5 is a message flow diagram illustrating message flows in the push message service method according to an embodiment of the disclosure. A description is made of the push message service method according to an embodiment of the disclosure with reference to FIGS. 1 and 5.

Referring to FIGS. 1 and 5, the service server 10 may register itself with the push servers 31 and 32 at operation S201. When registering itself with the push servers 31 and 32, the service server 10 may receive the authentication information.

Next, the service server 10 may store the certification and registration information received from the push servers 31 and 32 in the common push message manager 20 at operation S202.

Next, the platforms 41 to 45 may receive the push token as the service application certification information of the platform 41 to 45 from the respective push servers 31 to 35 operating on the corresponding OSs in registering the service application corresponding to the service server 10 at operation S203.

Next, the platforms 41 to 45 may send the push tokens received from the push servers 31 to 35 to the service server 10 at operation S204.

Afterward, the service server 10 may receive the message including at least one push token granted to the platforms 41 to 45 at operation S205.

Next, the service server 10 generates a common push message in the standardized formation in correspondence to at least one push token and sends the common push message to the common push message manager 20 at operation S206.

The common push message may be the push message generated by processing the message including plural push tokens received from the service server 10 in the standardized format predetermined in an embodiment of the disclosure. Since the structure and role of the common push message are identical with those described with reference to FIGS. 2 and 3, detailed descriptions thereof are omitted herein.

Subsequent to operation S206, the common push message manager 20 may parses the common push message received from the service server 10 at operation S207. The common push message manager 20 may verify the validity of the common push message. The common push message manager 20 parses the common push message to identify the push tokens of the recipient platforms 41 to 45, OS types, and platform types.

Next, the common push message manager 20 may convert the common push message according to the type of the corresponding OS per the identified push token at operation S209. That is, the common push message manager 20 converts the common push message according to the corresponding OSs of the identified push tokens to generate the push messages fit for the respective OSs. That is, the push messages corresponding to all message information (pns) may be generated.

Next, the common push message manager 20 may send the converted common push message to the service applications of the corresponding platforms 41 to 45 at operation S210. At this time, the certification procedure may be performed based on the message information (pns) included in the push message.

Meanwhile, the common push message manager 20 may register a new service server. The newly added service server may generate the common push message in a standardized formation regardless of the types of the OSs of the push servers.

In an embodiment of the present disclosure, the service servers may develop the common push message standardized based on the information provided by the common push message system instead of developing, at the service servers, push messages corresponding to distinct OSs individually.

The service servers extended and added afterward develop the common push message services in this way so as to facilitating use of the push services of various platforms.

A description is made of the account-based common push message service system of this disclosure hereinafter with reference to FIG. 6.

FIG. 6 is a block diagram illustrating a configuration of the common push message service system according to an embodiment of the disclosure.

Referring to FIG. 6, the common push message service system may include at least one service server 10, 11, and 12, first to fifth push servers 31 to 35, first to fifth platforms 41 to 45, a common push message manager 60, and a user information database 62. Since the components indicated by the same reference numbers as FIG. 1 are identical in role, detailed description thereon is omitted herein.

The service server 10 may receive the message including the user information. The user information may be the user account information of the recipient platform. There may be multiple recipient platforms corresponding to the user information.

The service server 10 may identify at least one push token pre-mapped to the user information. The user information and the push token pre-mapped thereto may be stored in the user information database 62 in advance.

For example, a user "Hong gil-dong" may own an iOS-based iPad 41, an Android-based smart note 44, and a Windows mobile-based smartphone 45 with the same user account information.

The iPad 41, smart note 44, and smartphone 45 may be granted distinct push tokens. The service server 10 may identify the push tokens of the iPad 41, smart note 44, and smartphone 45 that are mapped to the user's account information.

The service server 10 may processes the message to be transmitted to the platform corresponding to the identified push token to generate a common push message in the standardized format.

That is, the service server 10 may generate a common push message in the predetermined format in correspondence plural platform pre-mapped to one user account information included in the received message.

FIG. 7 is a diagram illustrating a table listing information elements constituting a common push message for use in the common push message service system according to another embodiment of the disclosure, and FIG. 8 is a diagram illustrating a common push message format for use in the common push message service system according to another embodiment of the disclosure.

Referring to FIGS. 7 and 8, the common push message according to another embodiment of the disclosure may include a unique received message identifier (tid), a unique user account information identifier (uid), a unique service server identifier (appid), and push server-specific message information (pns). The message informations (pns) may be arranged by push server.

The message information (pns) arranged by push server may include push message type (pushType) of the corresponding push server based on the OS of the platform corresponding to the push token, unique supplication identifier (pushAppid) of the service application corresponding to the service server, and the push token (pushToken) for identifying the platform.

The service server 10 may define the messages of all push services supported by the corresponding services in the message information of the account-based common push message and send the messages to the common push message manager 60.

The user information database 62 may store the user account information (uid) and the push token granted to at least one platform corresponding to the user account information (uid), a number of platforms owned by the user, types of the platforms, and push server certification information.

For example, the user information data base 620 may store the push tokens of the user-owned iPad 41, smart note 44, and smartphone 45 that are mapped to the user account information of the user "Hong gil-dong".

The common push message manager 60 may store the push server usage certification and registration information received from the service server 10.

The common push message manager 60 may convert the common push message received from the service server 10 to the push message according to the type of the OS corresponding to the platform of the push token identified by the service server 10. The common push message manager 60 may request to push the created push message to the push servers corresponding to the platforms 41 to 45.

For example, the common push message manager 60 may request the first push server 31 to push the message to the iPad 41, the fourth push server 340 to push the message to the smart note 44, and the fifth push server 35 to push the message to the smart phone 45. The common push message manager 60 is described in detail with reference to FIG. 9.

The first to fifth push servers 31 to 35 may receive the push request in the push message received from the common push message manager 60 and transfers the push request to the service applications of the corresponding platforms 41 to 45. The first to fifth push servers 31 to 35 may be configured in correspondence to the types of corresponding OSs of the respective platforms 41 to 45.

FIG. 9 is a block diagram illustrating a configuration of the common push message manager according to an embodiment of the disclosure. Referring to FIG. 9, the common push message manager 60 includes a message manager 200, an info manager 300, an account push info certification unit 400, push agents 500, 600, and 700, and a user information database 62. Since the components denoted by the same reference numbers as FIG. 4 are identical in role, detailed descriptions thereon are omitted herein.

The user database 62 may store the plural push tokens linked with the same user account. The user information database 62 also may store the information on the number of user-owned platforms, types of platforms, and push server certification.

If the message including the user account information is received, the service server 10 may identify at least one push token pre-mapped to the user account using the user information database.

The message manager 200 may include a message receiver 220, a message parser 240, and a message distributor 260. The info manager 300 may include an account info manager 320, a push info manager 340, and a certification info manager 360.

A message receiver 220 may receive a common push message from the service server 10. The message parser 240 may parse the received common push message and perform validity test on the common push message.

Particularly, the message parser 240 may identify at least one push token included in the common push message based on the message information (pns). For example, it is possible to identify the push tokes of the iPad 41, smart note 44, and smartphone mapped to the user account of Hong gil-dong.

The message distributer 260 may send the common push message per identified push token to at least one of the push agents 500 to 700.

The message distributer 260 may send the common push messages parsed by the message parser 240 and passed the validity text to the push agents 500 and 700.

The push agents 500, 600, and 700 may be configured in association with the corresponding push servers. That is, the push agents 500, 600, and 700 may be configured in association with the corresponding push servers in the common push message system.

For example, the first push agent 500 is provided in association with the first push server of APNS, the second push agent 600 in association with the second push server of SPP, and the fifth push agent 700 in association with the fifth push server of WNS.

The push agents 500, 600, and 700 may include the respective message creators 520, 620, and 720, and the respective message senders 540, 640, and 740.

The message creators 520, 620, and 720 may convert the received common push messages according to the type of the OS of the push server corresponding to the identified push token to generate the push message to be transmitted to the corresponding push server.

That is, the first message creator 520 may convert the common push message to the push message specific to iOS as the OS of the first push server 31, the second message creator 620 may convert the common push message to the push message specific to Android as the OS of the second push server 32, and the third message creator 720 may convert the common push message to the push message specific to Windows mobile as the OS of the fifth push server 35.

The message senders 540, 640, and 740 may request the corresponding push servers 31, 32, and 35 to push the push message generated by the message creators 520, 520, and 720.

That is, the first message sender 540 may send the push message generated by the first message creator 520 to the first push server 31, the second message sender 640 may send the push message generated by the second message creator 620 to the fourth push server 34, and the third message sender 740 may send the push message generated by the third message creator 720 to the fifth push server 35.

For example, the first push server 31 may send the push message to Hong gil-dong's iPad 41, the fourth push server 34 may send the push message to Hong gil-dong's smart note 44, and the fifth push server 35 may send the push message to Hong gil-dong's smartphone 45.

The account push info certification unit 400 may store the certification and registration information received from the first to fifth push servers 31 to 35 which the service server 10 intends to use.

The info manager 300 may register and manage the user account, push token, and the platform specific-push service certification received from the first to fifth platform 41 to 45.

FIG. 10 is a signal flow diagram illustrating signal flows in the push message service method according to an embodiment of the disclosure. A description is made of the push message service method according to an embodiment of the disclosure with reference to FIGS. 6 and 10.

Referring to FIGS. 6 and 10, the service 10 first registers itself with at least one push server 31 and 32 at operation S301. The service server 10 may receive the certification information from the push servers 31 and 32 in the registration process.

Next, the service server 10 may store the certification and registration information received from the at least one push server 31 and 32 in the common push message manager 60 at operation S302.

Next, when registering service apps corresponding to the service server 10, the platforms 41 to 45 may be granted push tokens as the service app certification information from the OS-specific push servers 31 to 35 at operation S303.

Next, the platforms 41 to 45 may send the user information including the push tokens received from the push servers 31 to 35 and the user account information of the platforms 41 to 45 to the service server 10 at operation S304.

Afterward, the service server 10 may receive the message including the user account information granted per platform at operation S305. The service server 10 may extract at least one push token pre-mapped to the user account information.

Next, the service server 100 may generate a common push message in the standardized format corresponding to the extracted push token and send the common push message to the common push message manager 60 at operation S306.

Next, the common push message manager 60 may parse the common push message received from the service server 10 at operation S307. Also, the common push message manager 60 may perform validity test on the common push message. The common push message manager 60 may parse the common push message to extract the user account information stored in the user information database 62 and the push tokens of the recipient platforms 41 to 45 mapped thereto.

That is, the common push message manager 60 may identify the push token, OS type, and platform type of the recipient platforms 41 to 45 as well as the recipient platforms 41 to 45 themselves pre-mapped to the user account information.

Next, the common push message manager 60 may converts the common push message according to the OS of the platform corresponding to the identified push token to generate the OS-specific push message at operation S309.

That is, the common push message manager 60 may convert the common push message to the push message format fit for the type of the OS of the platform identified based on the message information (pns). That is, the common push message manager 60 may generates push messages corresponding to all the message informations (pns).

Next, the common push message manager 60 may send the converted common push message to the service apps of the corresponding platforms 41 to 45 at operation S310. At this time, a certification procedure may be performed based on the message information (pns) included in the push message.

Unlike the conventional system in which the push service is generated in various versions for the OSs of the platforms owned by a user, the service server 10 according to an embodiment of the disclosure may generate a common push message based on the integrated user account corresponding to plural platforms linked to the same user account.

The service server is capable of identifying and managing the heterogeneous platforms owned by the user and sending messages to various OS-specific push servers, thereby a user owned plural terminals operating one distinct OSs may use the push messaging service by means of any of all the heterogeneous OSs-based terminals integrally based on the user account information.

FIG. 11 is a block diagram illustrating a configuration of the common push message system according to another embodiment of the disclosure.

Typically, the push service is provided under the assumption that the push server and the push daemon maintain the connection always open. If the connection is broken, this causes problem such as push message delivery delay and missing messages. When the connection between the push server and daemon is broken, ping is used to detect the connection breakage and reestablish the connection. However, the push daemons have different ping periods and this means that the breakage detection timings of the push daemons differ from each other.

The push daemon may be killed often due to the lack of hardware capability. The problem may be overcome with platform-specific multi push technique to improve Quality of Service (QoS).

This is the method of installing plural push daemons having different ping periods and receiving the push messages through the installed push daemons. Although one push daemon is malfunctioning, this can be compensated by other push daemons, resulting in improvement of message transmission reliability and reduction of message deliver time.

As described above, the common push message system for preventing push messages from being lost may be implemented as the common push message system depicted in any of FIGS. 1 and 6.

FIG. 11 is a block diagram illustrating a configuration of the common push message system according to another embodiment of the disclosure.

Referring to FIG. 11, the common push message system according to an embodiment of the disclosure may include a platform 40 for executing a service app, push servers 32, 33, and 34 of plural OSs executable on the platform 40, push daemons 37, 38, and 39 receiving push messages from the corresponding push servers 32, 33, and 34, and a common push message manager 80 managing the push servers 32, 33, and 34.

In detail, the push daemons 37, 38, and 39 having different ping periods are installed on the platform 40 and, among them, the push daemon which receives the push message first sends the push message to the service app.

The push servers 32, 33, and 34 push the service app-specific push messages received from the service server 10 to the platform 40 and correspond to the plural push daemons 37 to 39. For example, the SPP, C2DM, and AOM push daemons corresponding to Android OS may be installed on one platform.

The common push message manager 80 may manage the push servers 32 to 34 which send the push messages to the push daemons 37 to 39.

The push server corresponding to the push daemon which has received the push message first send an acknowledgement (ACK) to the common push message manager 80 and, upon the receipt of the ACK, the common push message manager 80 deletes the push messages corresponding to other push daemons with the exception of the push daemon which has received ACK to prevent duplicate push message from being sent to the service app of the platform 40.

The common push message manager 80 may delete the push message after a predetermined time since the delivery of the push message to the push servers 32 to 34.

The common push message manager 80 may delete the push message after sending the push message to the push servers 32 to 34 predetermines time in predetermined time duration.

FIG. 12 is a signal flow diagram illustrating message flows in a push message-missing protection system according to an embodiment of the disclosure.

Referring to FIG. 12, the service server 10 may receive a message at operation S405. The message may include a push token of the platform 40 or user account information.

The common push message manager 80 may receive a request for a common push message including the message from the service server 10 at operation S406.

If the common push message request is received, the common push message manager 80 sends the common push messages formatted according to the OSs of the push servers 32, 33, and 34, i.e. the first push message, second push message, and third push message, to the push servers 32, 33, and 34 at operation S407.

The one of the push daemons 37, 38, and 39 having different ping periods, e.g. push daemon 38, may receive the second push message first at operation S408.

Upon receipt of the second push message, the push daemon 38 may send the push message to the service app of the platform 40 at operation S409.

The push server 33 corresponding to the push daemon 38 which has received the second push message may send an acknowledgement (ACK) to the common push message manager 80 at operation S410.

If the ACK is received, the common push message manager 80 may delete the first and third push messages corresponding to the other push daemons 37 and 39 than the push daemon which has received the second push message at operation S411. In this way, it is possible to prevent redundant push messaged from being delivered to the service app of the platform 40.

According to the push service system of the disclosure, multiple push daemons having different ping periods are provided to receive a push message so as to prevent the push message from being delayed or lost.

The disclosure proposes diverse push message delivery methods through a common push platform supporting push services of multiple platforms, i.e. multi-platform multi-push, account-based multi-push, and platform-based multi-push.

As described above, the disclosure facilitates developing a service server using push services of multiple platforms, making it possible to support push services to the multiple devices linked to the same user account simultaneously, improving QoS by preventing the push message from being delayed or lost, and giving many chances of developing various services through push service usage method diversification.

As described above, the push message service system and method of the disclosure is capable of allowing the service servers to define common push message according to the standard provided by a common push message system instead of developing individual push messages corresponding to different OSs.

Also, the push message service system and method of the disclosure is capable of allowing the service server to develop a standardized single account-based push message including messages to be transmitted to plural platforms linked to the same user account.

Furthermore, the push message service system and method of the disclosure is capable installing plural push daemons having different ping periods on a platform so as to prevent the push message from being delayed or lost.

Although common push message service method and apparatus of the disclosure have been described using specific terms, the specification and drawings are to be regarded in an illustrative rather than a restrictive sense in order to help understand the disclosure. It is obvious to those skilled in the art that various modifications and changes can be made thereto without departing from the broader spirit and scope of the invention.

The invention claimed is:

1. A multi-push message system supporting multiple platforms, the system comprising:
   at least one service server configured to generate a multi-push message including per-terminal granted push tokens and messages (pns) to be transmitted per push server, the multi-push message being generated in a standardized format for a plurality of types of platforms;
   a multi-push message manager configured to:
      check validity of the multi-push message,
      parse the multi-push message,
      generate at least one push message from the multi-push message, the at least one push message corresponding to each of the types of the plurality of platforms of push servers based on the messages (pns), and
      send the at least one push message to the respective push servers; and
   a push server configured to transmit the at least one push message to the terminal corresponding to the push token.

2. The system of claim 1, wherein the at least one service server is further configured to send the multi-push message to the multi-push manager.

3. The system of claim 1, wherein the messages (pns) are arranged in the multi-push message per push server.

4. The system of claim 1, wherein the multi-push message comprises a unique requested message identifier (tid), a unique service server identifier (appid), and push message type information.

5. The system of claim 1, wherein the push token is a service certification information granted per terminal through certification test of the push server to be used by the terminal.

6. The system of claim 1, wherein the push server is further configured to send the push message to a push daemon included in the terminal which executes an application corresponding to the service server.

7. The system of claim 6, wherein the push daemon is supported depending on the platform of the terminal and is plural in number, the push daemons having different ping periods.

8. The system of claim 7, wherein the push daemon which receives the push message first among the push daemons forwards the push message to the app and other daemons skip forwarding the push message.

9. The system of claim 8, wherein the push server corresponding to the push daemon that received the push message first sends acknowledgement (ACK) to the multi-push message manager, and the multi-push message manager deletes the push messages corresponding to other push daemons.

10. The system of claim 8, wherein the multi-push message manager deletes the push message after a predetermined time since delivery of the push message to the push server.

11. The system of claim 8, wherein the multi-push message manager deletes the push message after sending the push message to the push server a predetermined number of times for the predetermined time.

12. A method for supporting multiple platforms, the method comprising:

receiving, by at least one service server, a message including a push token;

generating, by the at least one service server, a multi-push message in a standardized format for a plurality of types of platforms;

transmitting, by the at least one service server, the generated multi-push message to a multi-push message manager;

checking, by the multi-push message manager, validity of the multi-push message and parsing the multi-push message;

generating, by the multi-push message manager, a push message from the multi-push message, the push message corresponding to each of the types of the plurality of platforms based on the messages (pns) to be transmitted to a push server;

receiving, by the push server, the push message from the multi-push message manager; and transmitting, by the push server, the push message to the terminal corresponding to the push token.

13. The method of claim 12, wherein generating the multi-push message comprises arranging the messages (pns) to be transmitted per push server.

14. The method of claim 12, wherein the multi-push message comprises a unique requested message identifier (tid), a unique service server identifier (appid), and push message type information.

15. The method of claim 12, wherein the push message is transmitted to a plurality of push daemons included in the terminal executing app corresponding to the service server, supportable depending on a type of platform of the terminal, and having different ping periods.

16. The method of claim 15, further comprising sending, at the push daemon which receives the push message first among the plural push daemons, the push message to the app.

17. The method of claim 16, further comprising: sending, at the push server corresponding to the push daemon received the push message first, acknowledgement (ACK) to the multi-push message manager; and deleting, at the multi-push message manager, the push messages corresponding to other push daemons.

18. The method of claim 16, further comprising deleting, at the multi-push message manager, the push message after a predetermined time since delivery of the push message to the push server.

19. The method of claim 16, further comprising deleting, at the multi-push message manager, the push message after sending the push message to the push server a predetermined number of times for the predetermined time.

20. The method of claim 12, further comprising:

receiving, by the at least one service server, certification information after registering with the push server to use;

storing, by the at least one service server, the certification and registration information received from the push server in the multi-push message manager;

receiving, by the terminal, a push token as application authentication information from the push server based on the corresponding platform in registering a app corresponding to the service server;

transmitting, by the terminal, the push token to the service server; and storing, by the at least one service server, the push token to the multi-push message manager.

* * * * *